Oct. 16, 1962     L. W. WELCH ETAL     3,058,356
MAGNETIC CLUTCH STRUCTURE
Filed Oct. 26, 1959

INVENTORS
LEWIS W. WELCH
ALFRED F. MILLINGTON
BY HERMAN G. ADLER

ATTORNEYS 3,058,356
MAGNETIC CLUTCH STRUCTURE
Lewis W. Welch, Detroit, Alfred F. Millington, Northville, and Herman G. Adler, Detroit, Mich., assignors, by mesne assignments, to Lewis W. Welch, Los Angeles, Calif., trustee
Filed Oct. 26, 1959, Ser. No. 848,838
6 Claims. (Cl. 74—1.5)

The present invention relates to a magnetic clutch and refers more specifically to an improved magnetic clutch adapted for inclusion in a timing device.

One of the essential elements of the present invention is to provide a magnetic clutch structure which is very compact.

Another object is to provide a magnetic clutch structure wherein the individual members are formed to be more easily assembled and to provide more efficient operation than previous clutch members.

More specifically it is an object to provide a magnetic clutch structure wherein all connections between the members thereof are effected by press fitting the members or spinning the shouldered end of one member to lock it to another member.

Another object is to provide a magnetic clutch structure including a rotatably supported central shaft, a core slidably sleeved on one end of said shaft including a clutch surface at one end thereof, a gear rotatably sleeved on the other end of said shaft including a clutch surface adjacent the clutch surface on said core, a clutch activating coil and housing therefor surrounding the other end of said core and said one end of said shaft, and resilient means normally biasing said core to urge the clutch surface on said core into engagement with the clutch surface on said gear, said core moving toward said one end of said shaft on energization of said activating coil in opposition to said resilient means whereby said clutch surfaces are disengaged.

Another object is to provide a magnetic clutch structure as set forth above wherein said core includes a radially outwardly extending flange located centrally thereof and in close proximity to said clutch activating coil and housing therefor and also includes a radially inwardly converging other end adapted to fit within a mating portion of said housing, said flange and converging end aiding the movement of said core on energization of said activating coil.

Another object is to provide a magnetic clutch structure as set forth above including an annular element escapement wheel of a timing device attached to said core and wherein said gear is in mesh with the spring driven wheel of said timing device, said gear being freely rotatable by said spring driven wheel on disengagement of said clutch surfaces.

Another object is to provide a magnetic clutch structure as set forth above for use in a timing device such as a parking meter in which rotation of a spring driven wheel timed by an annular element escapement wheel gradually reduces the time indicated by said meter wherein said spring driven wheel is in mesh with said gear and said annular element escapement wheel is secured to said core, said gear being freely rotatable by said spring driven wheel on disengagement of said clutch surfaces to facilitate rapid reduction of the time indicated by said meter.

Another object is to provide a magnetic clutch structure as set forth above which is simple in operation, economical to manufacture, and efficient in use.

Other objects, advantages and novel details of construction of this invention will be made more apparent as the description proceeds, especially when considered in connection with the accompanying drawings wherein.

Figure 1:
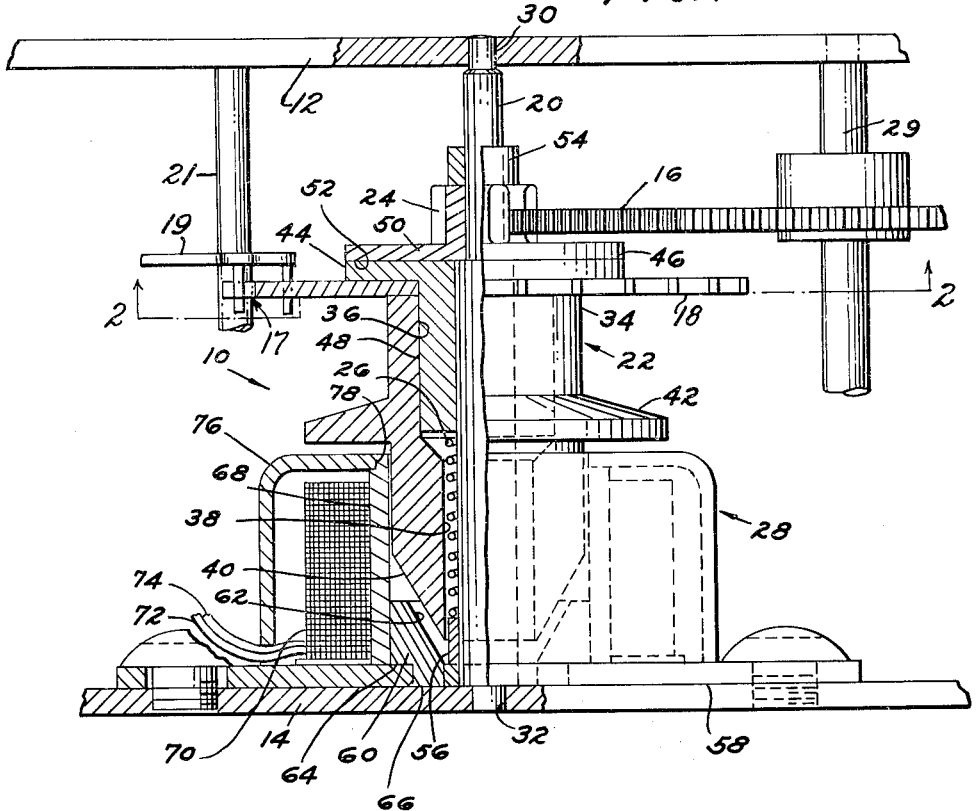
FIGURE 1 is a partly broken away elevational view of a magnetic clutch structure according to the invention.
Figure 2:
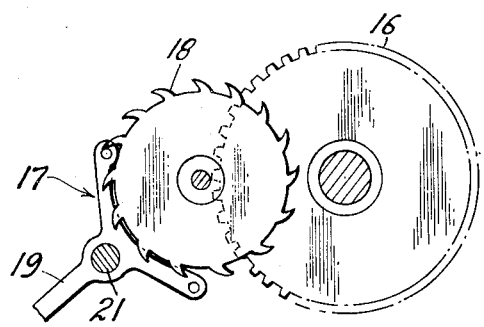
FIGURE 2 is a reduced partial section view of the magnetic clutch structure of FIGURE 1 taken on line 2—2 in FIGURE 1.

With reference to the figures, a particular embodiment of the magnetic clutch structure of the invention will now be described.

As shown in the figures the magnetic clutch structure of the invention generally indicated 10 is mounted between the mechanism supporting walls 12 and 14 of a timing device such as that used in parking meters, the spring wheel 16 and escapement mechanism 17 of which timing device are indicated in the figures. Magnetic clutch 10 as illustrated comprises shaft 20 journaled for rotation in walls 12 and 14, armature assembly 22 slidably sleeved on shaft 20 and gear 24 rotatably mounted on shaft 20 as shown in mesh with spring driven wheel 16. The magnetic clutch structure 10 also includes spring 26 operable to bias the armature assembly 22 into engagement with gear 24 and coil assembly 28 secured to frame wall 14 and operable on actuation to cause the armature assembly 22 to move downward relative to its position in FIGURE 1 to disengage gear 24 and armature assembly 22 thereby allowing the spring driven wheel 16 of the timing device to rotate unrestricted by the annular element escapement wheel 18 as will subsequently be seen.

More specifically the frame support walls 12 and 14 may be the usual walls of a timing device between which the numerous wheels and gears of the timing device, such as the spring driven wheel 16 and annular element escapement wheel 18 and pallet carrying rocking member 19 of escapement mechanism 17, may be mounted on shafts, such as 29, 20 and 21, which are journaled for rotation in the walls 12 and 14 or which may be fixed in relation to said walls in the usual manner. Shaft 20 of the magnetic clutch structure may be the normal shaft on which the annular element escapement wheel of the timing mechanism is mounted or may be a special shaft made especially for use in connection with the magnetic clutch structure. As shown, shaft 20 is jouraled for rotation in walls 12 and 14 at 30 and 32.

The armature assembly 22, as shown in FIGURE 1, comprises a cylindrical member 34 having portions 36 and 38 of larger and smaller internal diameter respectively and also including a radially inwardly converging outer surface 40 at one end thereof. The cylindrical member 34 is further provided with a radially outwardly extending annular flange 42 located substantially centrally thereof as shown. Member 34 is made of magnetic material so as to be attracted by the coil assembly 28 on activation thereof in the well-known manner of clutch structures. The radially extending flange 42 and the radially inwardly converging end surface 40 are provided on cylindrical member 34 to facilitate movement thereof by the coil assembly 28. The flange 42 and converging end surface 40 provide a low reluctance path for the magnetic flux created on energizing coil 70 whereby the flux is concentrated to increase the magnetic force tending to pull member 34 toward coil 70 in opposition to spring 26.

Armature assembly 22 further includes a clutch release plate 44 having a clutch surface 46 on one side thereof and having an inner sleeve portion 48 depending from the other side thereof as shown which is adapted to closely surround shaft 20 for axial sliding movement relative thereto. In assembly, annular element escapement wheel 18 is pressed over inner sleeve 48 and the cylindrical member 34 is likewise pressed on inner sleeve 48 whereby the larger diameter portion thereof provides an outer sleeve member concentric with said inner sleeve member. The clutch release plate annular element escapement wheel 18 and cylindrical member 34 are thus rigidly held in assembly and are mounted for axial sliding movement and rotation on shaft 20.

Clutch gear 24, as shown, is rotatably mounted on shaft 20 and includes at the end thereof adjacent said clutch release plate a radially outwardly extending annular flange 50 having a clutch surface 52 thereon adjacent clutch surface 46. As illustrated, the gear 24 is in mesh with the spring driven wheel 16 of the timing device in assembly and is held against axial movement upward on shaft 20, as shown in FIGURE 1 by means of bushing 54.

Spring 26, as shown in FIGURE 1, is also mounted on shaft 20 between the armature assembly 22 and a bushing 56 which is provided to prevent movement of the spring 26 in a downward direction as shown in FIGURE 1. Spring 26 functions to bias the armature assembly 22 into engagement with the gear 24 over clutch surfaces 46 and 52 when the coil assembly 28 is not energized.

The coil assembly 28 comprises an annular base member 58 of magnetic material, an annular pole member 60 having a radially inwardly converging inner surface 62 in mating relation to the radially converging end of the cylindrical member 34 as shown in FIGURE 1. Pole member 60 is attached to base member 58 around the inner circumference thereof by means of a spinning operation whereby the base member 58 is held between an annular shoulder 64 on pole member 60 on one side and the spun end 66 of the pole member 60 on the other side. A nonmagnetic cylindrical bushing 68, as shown in FIGURE 1, is secured to the magnetic pole member by means of a press fit therebetween. The coil 70 which may be energized through leads 72 and 74 to actuate the magnetic clutch structure 10 is wound on bushing 68 as illustrated. The cup-shaped housing 76 having an annular opening 78 therethrough is secured to the bushing 68 as shown by means of spinning the end of bushing 68 as previously described in conjunction with the connection between the pole member and base member of the coil assembly. The housing 76 is of magnetic material.

It will be noted that all connections between the members of the coil assembly and the armature assembly are effected by either press fits or spun ends. Thus no heat is applied to the assemblies during the manufacture thereof. Therefore, applicants' structure may be produced in a most efficient manner without damage to the elements thereof which might occur should welded or soldered connections be used in the assembly thereof.

In the operation of applicants' magnetic clutch structure the armature assembly will normally be biased by means of spring 26 into contact over clutch surfaces 46 and 52 with gear 24 whereby the rotation of the spring driven wheel 16 of a timing device such as a parking meter in which the clutch assembly 10 is used is controlled by the allowed movement of the annular element escapement wheel 18 of the timing device in the usual manner of such timing devices. On energization of coil 70 due to a particular phenomenon, such as, for example, an automobile moving out of a parking space in conjunction with which said timing device is used, the armature member is caused to move downward, as shown in FIGURE 1, whereby the clutch surfaces 46 and 52 are caused to disengage. Disengagement of clutch surfaces 46 and 52 permits free rotation of gear 24 on shaft 20 whereby the spring driven wheel 16 of the timing device is also allowed to rotate without the usual controlling effect of the annular element escapement wheel 18 to allow the timing device to rapidly return to a minimum indication at which time the coil 70 may be de-energized. De-energizing coil 70 allows armature 22 to move upward under bias from spring 26 whereby clutch surfaces 46 and 52 are again engaged returning the spring wheel 16 to the control of annular element escapement wheel 18.

Thus it will be seen that applicants have provided novel, compact and efficient clutch structure for inclusion in a timing device, such as a parking meter, which is operable to release the spring driven wheel thereof from control of the annular element escapement wheel during periods of energization of the clutch structure.

What we claim as our invention is:

1. An armature assembly for a magnetic clutch structure comprising a hollow cylindrical member having a radially outwardly extending substantially centrally located annular flange, an axially outwardly, radially inwardly converging outer surface at one end of the hollow cylindrical member, and a sleeve secured against rotation within and having one end extending out of the other end of said cylindrical member, said sleeve having an annular clutch release plate secured to said one end thereof adapted to secure an annular element against the other end of said cylindrical member.

2. A coil assembly for a magnetic clutch structure comprising an annular base plate of conductive material, an annular pole member of conductive material secured to said base plate around the inner circumference of said base plate, a cylindrical bushing of nonconductive material having one end secured to said pole member, an electrical coil wound on said bushing, and a cup-shaped housing of conductive material for said coil having an opening in the bottom thereof, the other end of said bushing being secured to said housing around the circumference of said opening.

3. In a timing device including timing mechanism having a spring wheel and an escapement wheel, a magnetic clutch structure comprising a rotatably mounted shaft, a cylindrical armature assembly slidably sleeved on said shaft carrying the escapement wheel of the timing mechanism for rotation therewith and including a clutch surface on one end thereof, an annular gear rotatably mounted on said shaft adjacent said one end of said armature and engaged with the spring wheel of the timing mechanism, said gear including a clutch surface engageable with said clutch surface on said armature assembly, means restraining said gear from axial movement toward the end of said shaft away from said armature, resilient means biasing said armature assembly toward said annular gear to maintain said clutch surfaces in contact to prevent rotation of the spring wheel free of the escapement wheel, and an annular actuating coil assembly sleeved over the other end of said armature assembly and secured in fixed position with respect thereto, said actuating coil assembly being operable on electrical energy being passed therethrough to cause said armature assembly to move away from said gear in opposition to said resilient means whereby said clutch surfaces are disengaged to permit rotation of the spring wheel free of the escapement wheel of the timing mechanism.

4. In a timing device including timing mechanism having a spring wheel and an escapement wheel, a magnetic clutch structure comprising a rotatably mounted shaft, a cylindrical armature assembly slidably sleeved on said shaft carrying the escapement wheel of the timing mechanism for rotation therewith and including a clutch surface on one end thereof, an annular gear rotatably mounted on said shaft adjacent said one end of said armature and engaged with the spring wheel of the timing mechanism, said gear including a clutch surface engageable with said clutch surface on said armature assembly, means restraining said gear from axial movement toward the end of said shaft away from said armature, resilient means biasing said armature assembly toward said annular gear to maintain said clutch surfaces in contact to prevent rotation of the spring wheel free of the escapement wheel, an annular actuating coil assembly sleeved over the other end of said armature assembly and secured in fixed position with respect thereto, said actuating coil assembly being operable on electrical energy being passed therethrough to cause said armature assembly to move away from said gear in opposition to said resilient means whereby said clutch surfaces are disengaged to permit rotation of the spring wheel free of the escapement wheel of the timing mechanism, said armature assembly including a radially outwardly extending annular flange positioned in close axial proximity to said actuating coil assembly, and a cylindrical pole member sleeved over and secured in a fixed position relative to said shaft adjacent said other end of said armature, said pole member having an inner surface converging radially inwardly, axially inwardly thereof, said other end of said armature having a similarly radially inwardly, axially outwardly converging outer surface, said annular flange and converging surfaces being operable to facilitate movement of said armature assembly toward said coil on electrical energy being passed through said coil.

5. In a timing device including timing mechanism having a spring wheel and an escapement wheel, a magnetic clutch structure comprising a shaft, a cylindrical armature assembly slidably sleeved on said shaft carrying the escapement wheel of the timing mechanism for rotation therewith and including a clutch surface thereon, a gear rotatably mounted on said shaft engaged with the spring wheel of the timing mechanism, said gear including a clutch surface engageable with said clutch surface on said armature assembly, means restraining said gear from axial movement away from said armature assembly, resilient means biasing said armature assembly toward said gear to maintain said clutch surfaces in contact to prevent rotation of the spring wheel free of the escapement wheel, and an annular actuating coil assembly secured in fixed position with respect to said armature assembly, said actuating coil assembly being operable on electrical energy being passed therethrough to cause said armature assembly to move away from said gear in opposition to said resilient means whereby said clutch surfaces are disengaged to permit rotation of the gear and spring wheel free of the escapement wheel of the timing mechanism.

6. A magnetic clutch comprising a coil assembly including an annular base plate of conductive material, an annular pole member of conductive material secured to said base plate around the inner circumference of said base plate, a cylindrical bushing of nonconductive material having one end secured to said pole member, an electrical coil wound on said bushing, and a cup-shaped housing of conductive material for said coil having an opening in the bottom thereof, the other end of said bushing being secured to said housing around the circumference of said opening, a shaft extending through the cylindrical bushing of the coil assembly, an armature assembly sleeved over said shaft including a cylindrical member one end of which is inserted within the cylindrical bushing of the coil assembly having a radially outwardly extending substantially centrally located annular flange adjacent the bottom of the cup-shaped housing and an axially outwardly, radially inwardly converging outer surface at said one end and a sleeve secured against rotation within and having one end extending out of the other end of said cylindrical member, said sleeve having an annular clutch surface on said one end thereof adapted to secure an annular member against the other end of said cylindrical member, an annular member having a clutch surface thereon in engagement with the clutch surface on said sleeve rotatably mounted on said shaft, means limiting movement of said annular member in a direction away from the sleeve and means mounted on the shaft within the cylindrical member of the armature assembly operable between the other end of the sleeve and the coil assembly for biasing the armature assembly toward the annular member to engage the clutch surfaces on the sleeve and annular member.

References Cited in the file of this patent

UNITED STATES PATENTS

| | | |
|---|---|---|
| 502,157 | Wiseman | July 25, 1893 |
| 540,420 | Burry | June 4, 1895 |
| 934,104 | Steckel | Sept. 14, 1909 |
| 979,402 | Livingston | Dec. 20, 1910 |
| 1,944,380 | Vance | Jan. 23, 1934 |
| 1,973,275 | Babson | Sept. 11, 1934 |
| 1,993,413 | Mellon | Mar. 5, 1935 |
| 2,253,309 | Smellie | Aug. 19, 1941 |
| 2,337,742 | Dittmar | Dec. 28, 1943 |
| 2,401,003 | Lear | May 28, 1946 |
| 2,490,044 | Garbarini et al. | Dec. 6, 1949 |
| 2,529,533 | Almond et al. | Nov. 14, 1950 |
| 2,530,180 | Russell | Nov. 14, 1950 |
| 2,547,137 | Ochtman | Apr. 3, 1951 |
| 2,575,095 | Charbomneau et al. | Nov. 13, 1951 |
| 2,724,474 | Hupp | Nov. 22, 1955 |
| 2,743,141 | Beck et al. | Apr. 24, 1956 |
| 2,855,666 | Gleitz | Oct. 14, 1958 |
| 2,893,256 | Wargo | July 7, 1959 |